United States Patent
Antoñana Gastesi et al.

(10) Patent No.: US 8,602,768 B2
(45) Date of Patent: Dec. 10, 2013

(54) MOULD FOR MOULDED PARTS WITH INTERNAL UNDERCUTS

(75) Inventors: Francisco Javier Antoñana Gastesi, Pamplona (ES); Felix Gale Oneca, Pamplona (ES); Jose Javier Berro Preboste, Pamplona (ES); Luis Larumbe San Martin, Pamplona (ES)

(73) Assignee: Irumold, S.L., Pamplona (Navarra) (ES)

( * ) Notice: Subject to any disclaimer, the term of this patent is extended or adjusted under 35 U.S.C. 154(b) by 0 days.

(21) Appl. No.: 13/701,078

(22) PCT Filed: May 6, 2011

(86) PCT No.: PCT/ES2011/000152
§ 371 (c)(1), (2), (4) Date: Nov. 30, 2012

(87) PCT Pub. No.: WO2011/015464
PCT Pub. Date: Dec. 15, 2011

(65) Prior Publication Data
US 2013/0071509 A1    Mar. 21, 2013

(30) Foreign Application Priority Data
Jun. 11, 2010   (ES) .................................. 201000774

(51) Int. Cl.
*B29C 45/33*    (2006.01)
(52) U.S. Cl.
USPC ........... 425/438; 425/441; 425/443; 425/468; 425/393; 249/180; 249/184

(58) Field of Classification Search
USPC ...... 425/438, 468, 577, DIG. 58, 393, 436 R, 425/441, 443; 249/145, 178, 180, 184, 186
See application file for complete search history.

(56) References Cited

U.S. PATENT DOCUMENTS

| | | | | | |
|---|---|---|---|---|---|
| 2,155,316 | A | * | 4/1939 | Lauterbach | 425/138 |
| 2,400,024 | A | * | 5/1946 | Roehrl | 242/580.1 |
| 3,058,158 | A | * | 10/1962 | Aghnides | 249/160 |
| 3,099,046 | A | * | 7/1963 | Klumpp, Jr. et al. | 249/142 |
| 3,570,585 | A | * | 3/1971 | Harris | 164/245 |
| 3,587,156 | A | * | 6/1971 | Sorenson et al. | 29/890.127 |
| 4,019,711 | A | * | 4/1977 | Altenhof et al. | 249/59 |

(Continued)

FOREIGN PATENT DOCUMENTS

| | | |
|---|---|---|
| ES | 2 003 806 | 5/1987 |
| GB | 1 094 202 | 12/1967 |
| JP | 57-69005 | 4/1982 |

OTHER PUBLICATIONS www.e-industria.com, "Los moldes de inyeccion of plastico de colada y canal calientes," Aug. 12, 2008.

*Primary Examiner* — Seyed Masoud Malekzadeh
(74) *Attorney, Agent, or Firm* — Lucas & Mercanti, LLP

(57) ABSTRACT

Mold for molded parts with internal undercuts that comprises a core of the mold with two complementary parts (both fitted one inside the other), providing the possibility of axial displacement and turning among them, establishing the external element part various slots where the parallel forms that the internal element part has in its peripheral area are inserted. Thus, thanks to the axial displacement and the turning of both elements, the parallel forms come out of from the slots and deviate from the coping enabling the ejection of the molded part without being forced.

4 Claims, 6 Drawing Sheets

(56) References Cited

U.S. PATENT DOCUMENTS

| | | | |
|---|---|---|---|
| 4,286,766 A * | 9/1981 | von Holdt | 249/144 |
| 4,383,819 A * | 5/1983 | Letica | 425/577 |
| 4,533,312 A * | 8/1985 | Von Holdt | 425/438 |
| 4,541,605 A * | 9/1985 | Kubota et al. | 249/142 |
| 4,622,198 A * | 11/1986 | Gallusser et al. | 264/318 |
| 4,676,732 A * | 6/1987 | Letica | 425/577 |
| 4,737,334 A * | 4/1988 | Folding et al. | 264/318 |
| 4,787,596 A * | 11/1988 | Folding et al. | 249/59 |
| 5,403,179 A * | 4/1995 | Ramsey | 425/577 |
| 5,458,473 A * | 10/1995 | Banji | 425/116 |
| 5,597,593 A * | 1/1997 | Lebensfeld et al. | 425/441 |
| 5,660,758 A * | 8/1997 | McCullough | 249/59 |
| 5,690,159 A * | 11/1997 | Mizukusa | 164/132 |
| 5,759,592 A * | 6/1998 | Piramoon et al. | 425/414 |
| 5,824,256 A * | 10/1998 | Ballester | 264/318 |
| 6,079,973 A * | 6/2000 | Manera et al. | 425/556 |
| 6,099,785 A * | 8/2000 | Schweigert et al. | 264/328.1 |
| 6,190,600 B1 * | 2/2001 | Lipniarski | 264/318 |
| 6,506,330 B1 * | 1/2003 | Schweigert et al. | 264/318 |
| 6,615,990 B1 | 9/2003 | Jokschas et al. | |
| 6,733,269 B2 * | 5/2004 | Niese | 425/350 |
| 6,796,768 B2 * | 9/2004 | Fujinaka et al. | 415/208.5 |
| 8,002,538 B2 * | 8/2011 | Zydron | 425/417 |
| 2002/0086080 A1 * | 7/2002 | Manera | 425/438 |
| 2002/0121725 A1 * | 9/2002 | Sobolewski | 264/163 |
| 2004/0115300 A1 * | 6/2004 | Zuffa | 425/422 |
| 2004/0115301 A1 * | 6/2004 | Manera | 425/438 |

* cited by examiner

000# MOULD FOR MOULDED PARTS WITH INTERNAL UNDERCUTS

CROSS-REFERENCE TO RELATED APPLICATIONS

This application is a 371 of PCT/ES2011/000152 filed May 6, 2011, which claims the benefit of priority from Spanish Patent Application No. P201000774 filed Jun. 11, 2010, the contents of each of which are incorporated herein by reference.

FIELD OF THE ART

This invention is related to the obtaining of moulded parts with internal undercuts and it proposes a mould formed by a functional ensemble that enables the draft of this kind of parts without being subject to deteriorating stresses.

STATE OF THE ART

Due to the characteristics and possibilities of the technique, the injection moulding is used to produce all kind of parts. Some of these parts have problems during the draft process, and this is significant in the moulded parts with internal undercuts.

To obtain this kind of parts, it is normally used a draft process of forced ejection of the moulded parts. This way, the internal prominent areas of the said parts are subject to distortion stresses that, in case they exceed the yield stress of the material, may cause such deterioration that may lead to the rejection of the parts.

For this purpose, draft methods based on the technique of collapsible cores and mechanical systems of conical or linear displacement on inclined plane have been developed, with its application in parts exceeding the size of 25 millimeters. These methods are not applicable for smaller parts and, in such case, it can only be applied the technique of forced ejection.

In some sectors, like for example the medical or pharmaceutical sectors, we can find very small tools that must be produced in a very precise way. It is very difficult to apply the normal techniques of injection moulding for this kind of tools. This causes a high percentage of rejections and high costs in the maintaining tasks of the mould.

OBJECT OF THE INVENTION

According to the invention, it is proposed a structured mould with characteristics that enable the draft of moulded parts with internal outgoings, avoiding the distortion of the parts. This way, it is possible to obtain undamaged parts.

Similarly, this solution allows the design of parts with steeper undercuts, something which is unviable with the current technology due to the high risk of breakages and distortions during the draft process.

The mould of the invention comprises a core that has to be fitted inside a cavity in order to form, in the space between both elements, the part to be produced. The core is formed by two complementary parts that fit in the cavity (the parts are coupled one inside the other). It is possible the axial ejection and the turning of the internal part in relation to the external part. The external part creates a series of gaps where the parallel forms protruding from the outline of the internal part are fitted.

Thus, it can be obtained an ensemble of internal core of the mould that fits in a cavity and in which it can be produced moulded parts with internal undercuts corresponding to the intermediate spaces created between the parallel forms of the internal part of the core. This way, thanks to the axial displacement of the internal part of the core, in respect of the external part, together with the moulded part, and to the subsequent turning of the said internal part of the core, in respect of the moulded part, the internal outgoings of the moulded part are released and the part can be ejected without being subject to distortions.

Thanks to this invented mould, it is possible to obtain, with precision and without distortions, moulded parts with internal undercuts in parts of every size. Thus, the mould is very good for its function and its use is preferential to the conventional systems with the same application.

DETAILED DESCRIPTION OF THE INVENTION

The object of the invention is referred to a mould dedicated to the moulding of moulded parts with internal undercuts, offering a simple draft process of the parts without causing distortions.

The recommended mould comprises a core intended to be fitted inside the cavity (not represented) to create a space between both elements where the produced part will be formed. The core is formed by two complementary elements (1 and 2) that fit inside the cavity. The parts are arranged in a linkage situation (one inside the other) being the element part (1) an empty cylinder. Inside this empty cylinder it is inserted the element part (2) which consists of a cylindrical body with a diameter corresponding to the internal diameter of the element part (1).

Figure 1:
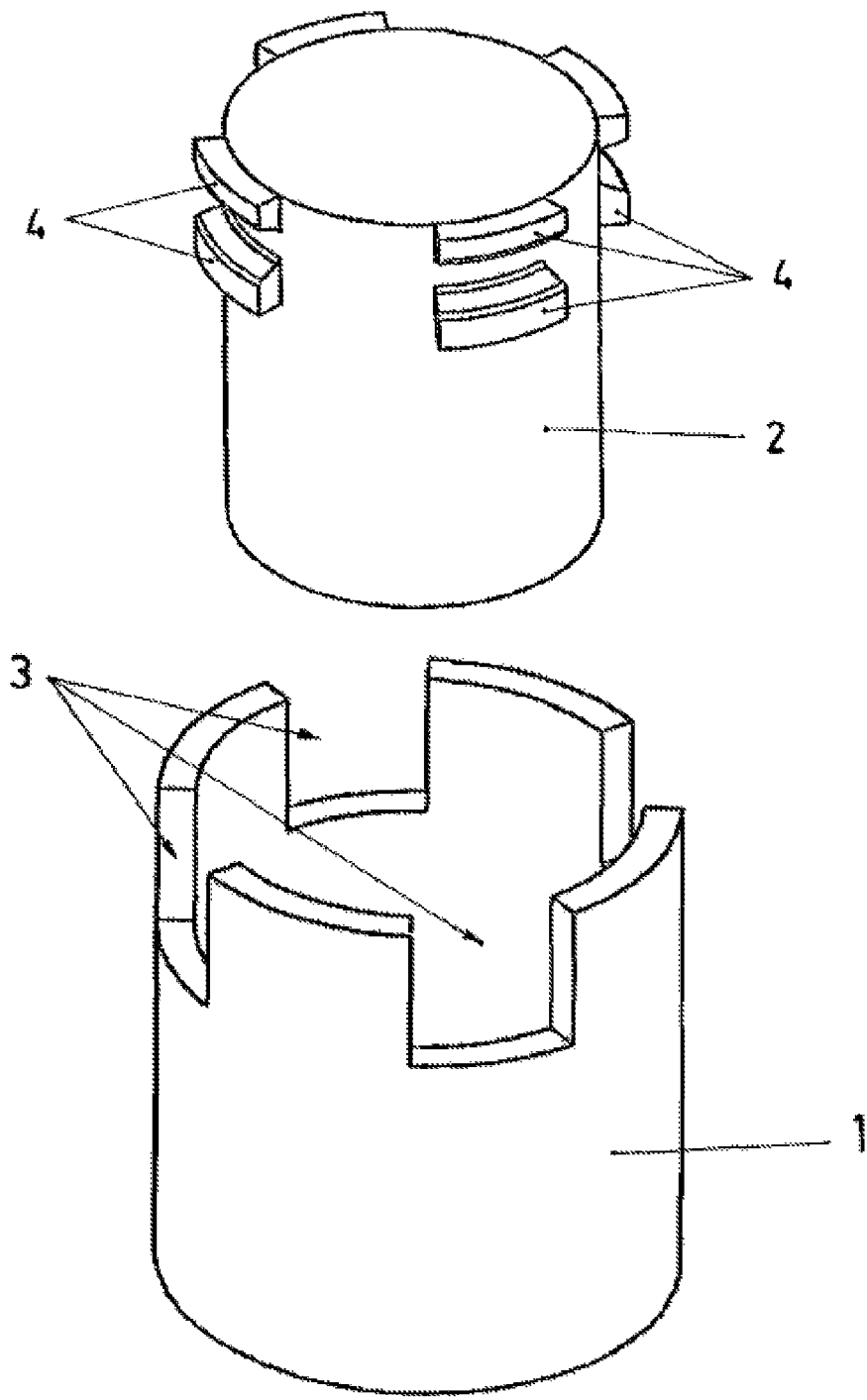
FIG. 1 schematically shows an exploded perspective of the ensemble of an internal core of the mould according to the invention.
Figure 2:
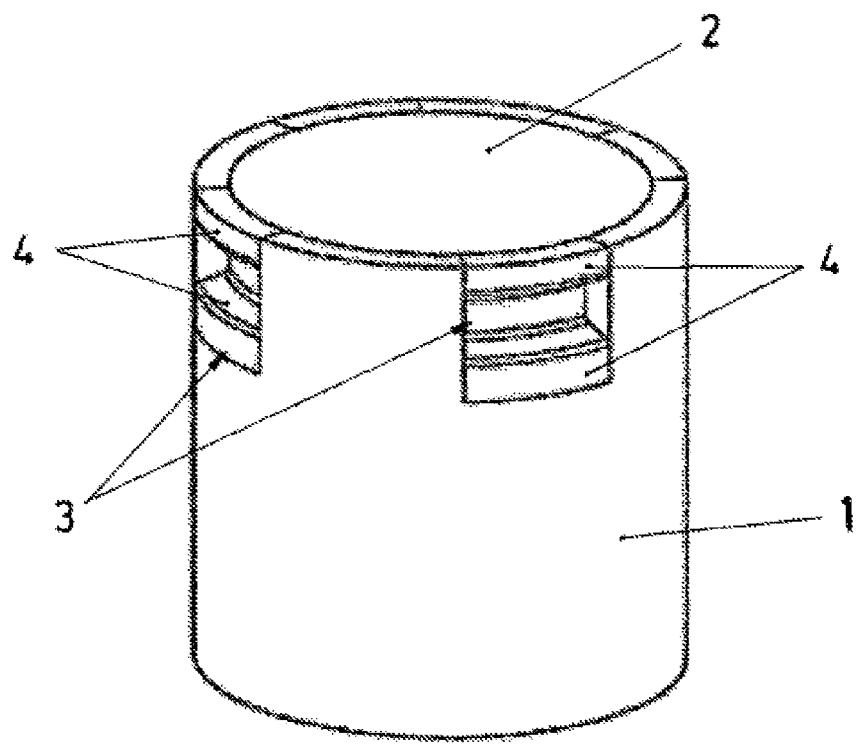
FIG. 2 shows a perspective of the ensemble of the previous figure coupled in the moulding position.

The empty cylinder of the element part (1) establishes the edge of the end in which it is inserted the element part (2), various slots (3), while the cylindrical body of the element part (2) has in the peripheral area various parallel forms (4) that correspond to the said slots (3) of the element part (1). Those parallel forms (4) are coupled transversely in the said slots (3) when the two element parts (1 and 2) are coupled one inside the other, as represented in FIG. 1.

Figure 7:
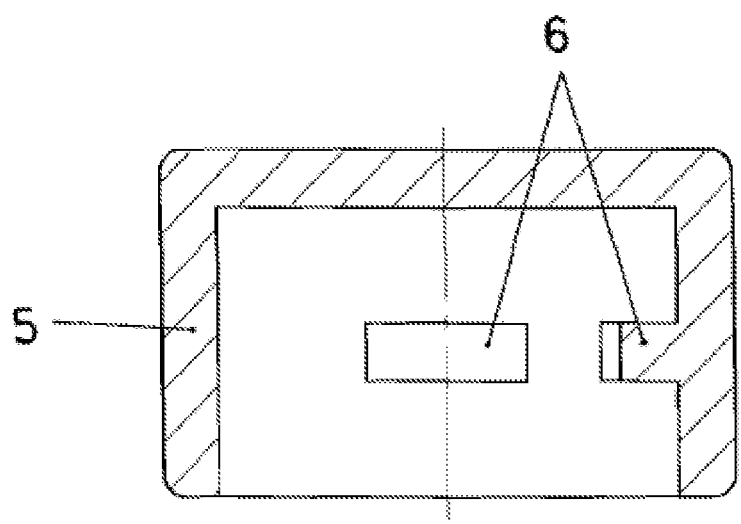
FIG. 7 shows, in a cut-away view, an example of the type of parts that can be produced with the invented mould.
Figure 8:
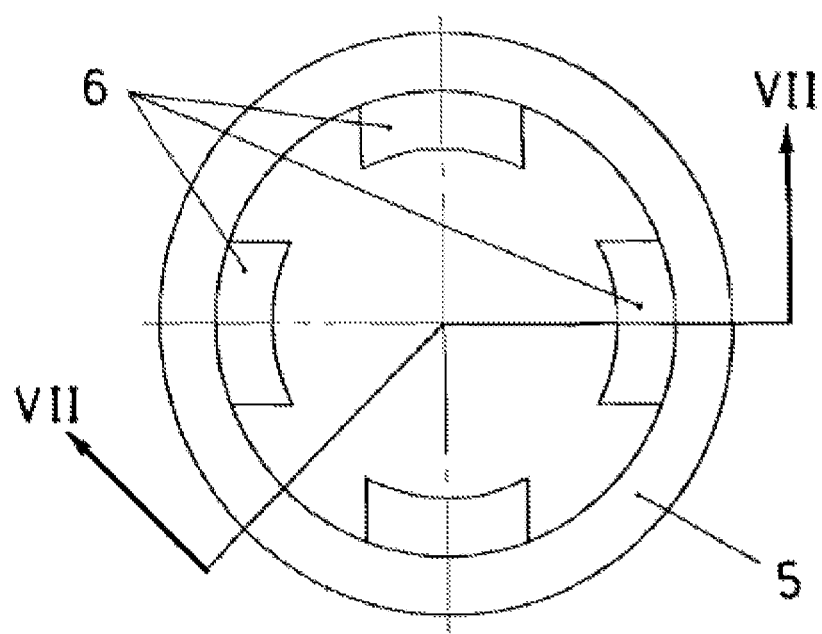
FIG. 8 is a moulded part with internal undercuts viewed from the inside.

In this position, the moulded parts (5) can be moulded on the ensemble of the core of the mould, as represented in FIGS. 7 and 8, which is not a limited performance. The parts are shaped on the external surface of the element part (1) and the moulded part (5) has internal undercuts (6) formed between the parallel forms (4) of the element part (2).

Figure 3:
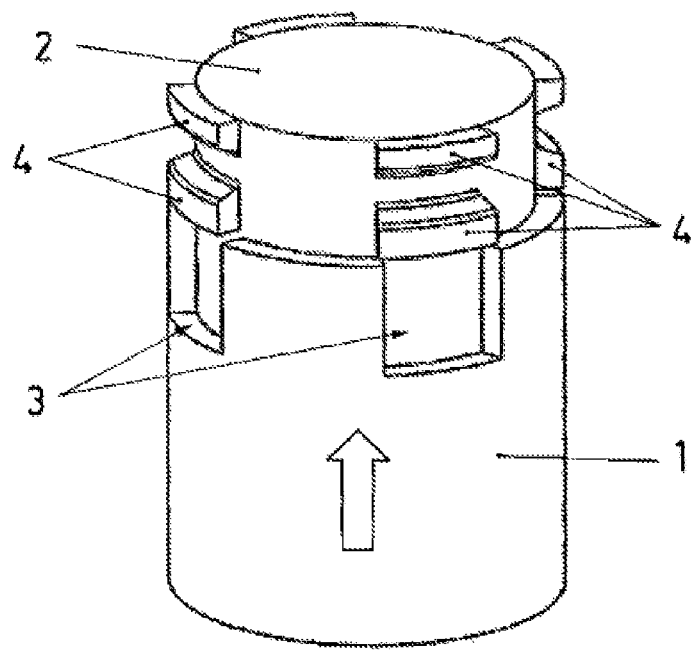
FIG. 3 is a perspective of the ensemble of the core of the mould in the position of the first step of the draft process.

In order to draft the resulting moulded parts (5), in respect of the said core of the mould, after having ejected the ensemble from the cavity (not represented) of the mould, it is first necessary to make an axial displacement of the element part (2) in respect of the element part (1) of the ensemble of the core of the mould, as represented in FIG. 3. This way, the internal undercuts (6) of the moulded part (5), together with the parallel forms (4) of the element part (2), are released from the slots (3) of the element part (1).

Figure 4:
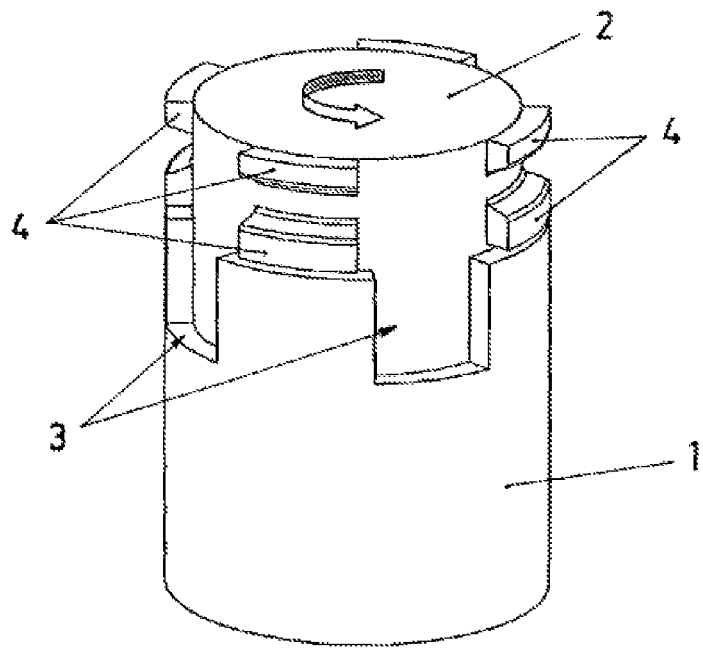
FIG. 4 is a perspective of the ensemble of the core of the mould in the position of the second step of the draft process.
Figure 5:
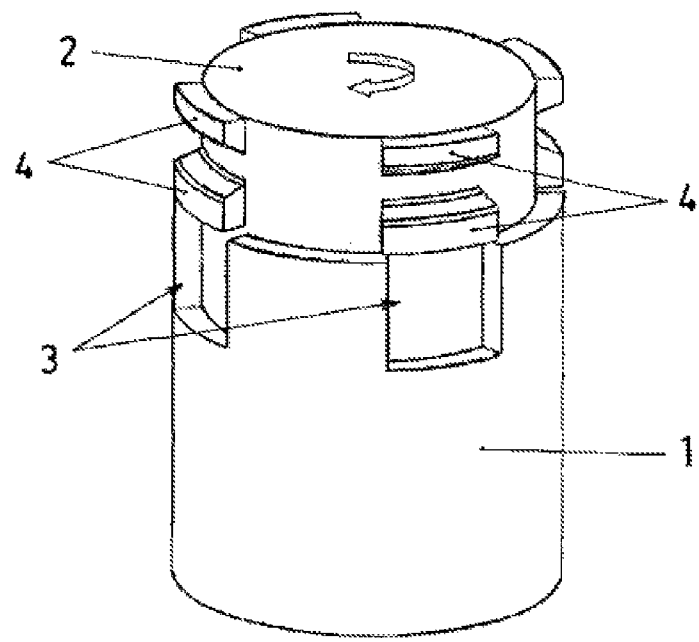
FIG. 5 is a perspective of the ensemble of the core of the mould in the first step of return to the moulding position.
Figure 6:
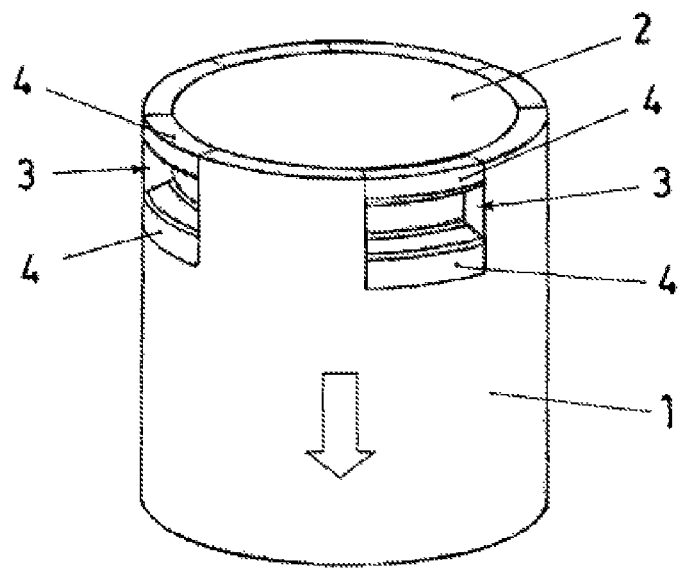
FIG. 6 is a perspective of the ensemble of the core of the mould in the second step of return to the moulding position.

In this position, the element part is turned (2), in respect of the element part (1), as represented in FIG. 4, keeping the moulded part (5) fixed during the turning, together with the element part (1). This way, the internal undercuts (6) of the moulded part (5) are released from the parallel forms (4) of the element part (2).

In this situation, the moulded part (5) is not retained in respect of the element parts (1 and 2) of the ensemble of the core of the mould. This way, the moulded part (5) can be easily ejected without causing distortions in its internal undercuts (6), providing precisely produced moulded parts (5).

Once the moulded part (5) is ejected, to put the mould back to its initial position, it is necessary to turn the element part (2) of the core of the mould, in the opposite direction to that of the draft process, until the parallel forms (4) are face to face with the slots (3) of the element part (1), as represented in FIG. 7. Then the element part (2) is axially displaced towards the inside area of the element part (1), as represented in FIG. 8.

The element parts (1 and 2) of the core of the mould can obviously have any form that corresponds to the parts (5) that need to be moulded, provided that they comply with the condition of being parts that can be fitted one inside the other and the condition of being able to be axially displaced and turned among them, and provided that they have complementary parts that may form internal undercuts (6) of the parts (5) to be moulded, so that the internal undercuts (6) of the moulded parts (5) can be released thanks to the axial displacement and subsequent turning of the element parts (1 and 2).

The activation of the displacement and the turning of the complementary parts (1 and 2), for the coupling up to the moulding position and for the draft can be either manual or mechanical. It can be used any type of conventional system, such as hydraulic, pneumatic, electric, etc. without being a cause of alteration of the concept of the invention.

The invention claimed is:

1. Mould for moulded parts with internal undercuts comprising:
    a core; and
    a cavity,
the core coupled inside the cavity in order to create a space between the core and the cavity for producing the respective moulded part, wherein,
the core is formed by an external element and an internal element, the external element and internal element being complementary parts that fit in the cavity,
the internal element housed inside the external element, the external element and internal element being axially displaceable and rotatable between each other,
the external element having a plurality of slots and the internal element having a plurality of parallel protrusions, so that the plurality of protrusions and the plurality of slots are coupled such that the plurality of protrusions reside in the plurality of slots, and an axial displacement and a rotation of both the external element and internal element causes the plurality of parallel protrusions to come out from the plurality of slots and deviate from the coupling in order to release and eject the respective moulded part without causing distortions in the internal undercuts of the respective moulded part.

2. Mould for moulded parts with internal undercuts, according to claim 1, wherein the external element of the core of the mould is an empty cylinder with slots in one end and the internal element is inserted into the empty cylinder.

3. Mould for moulded parts with internal undercuts, according claim 1, wherein the internal element of the core of the mould is a cylindrical body with a diameter corresponding to an internal diameter of the external element, the cylindrical body having parallel forms that transversally fit in the slots of the external element.

4. Mould for moulded parts with internal undercuts, according to claim 1, wherein an activation of the axial displacement and a turning between the external element and the internal element can be made both manually and mechanically.

* * * * *